US012761577B2

(12) United States Patent
Saito et al.

(10) Patent No.: US 12,761,577 B2
(45) Date of Patent: Oct. 13, 2026

(54) CHARGING ROLL FOR ELECTROPHOTOGRAPHIC APPARATUSES

(71) Applicant: Sumitomo Riko Company Limited, Aichi (JP)

(72) Inventors: Yoshihiro Saito, Aichi (JP); Akitoshi Morita, Aichi (JP); Takeru Horiuchi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 19/260,624

(22) Filed: Jul. 7, 2025

(65) Prior Publication Data

US 2025/0334899 A1 Oct. 30, 2025

Related U.S. Application Data

(63) Continuation of application No. PCT/JP2024/009201, filed on Mar. 9, 2024.

(30) Foreign Application Priority Data

Mar. 29, 2023 (JP) ................................. 2023-053091

(51) Int. Cl.
*G03G 15/02* (2006.01)
*C08J 7/04* (2020.01)
(Continued)

(52) U.S. Cl.
CPC ........ *G03G 15/0233* (2013.01); *C08J 7/0427* (2020.01); *C08K 3/04* (2013.01);
(Continued)

(58) Field of Classification Search
CPC ............... G03G 15/02; G03G 15/0233; G03G 2215/025; C08J 7/0427; C08J 2307/00;
(Continued)

(56) References Cited

U.S. PATENT DOCUMENTS

| | | | | |
|---|---|---|---|---|
| 10,754,272 | B1 * | 8/2020 | Nonaka | G03G 15/0233 |
| 2018/0275552 | A1 * | 9/2018 | Satoh | G03G 15/0233 |
| 2024/0059875 | A1 | 2/2024 | Saito et al. | |

FOREIGN PATENT DOCUMENTS

| | | |
|---|---|---|
| JP | 2003140442 | 5/2003 |
| JP | 2023005335 | 1/2023 |

OTHER PUBLICATIONS

"International Search Report (Form PCT/ISA/210) of PCT/JP2024/009201", mailed on Apr. 9, 2024, with English translation thereof, pp. 1-4.

* cited by examiner

*Primary Examiner* — Sophia S Chen
(74) *Attorney, Agent, or Firm* — JCIPRNET

(57) ABSTRACT

A charging roll for electrophotographic apparatuses includes: a shaft body, an elastic body layer formed on an outer circumferential surface of the shaft body, and a surface layer formed on an outer circumferential surface of the elastic body layer. The elastic body layer contains a non-polar rubber, a polar rubber, and a carbon black, and has a relative permittivity of 7 or more and 29 or less and a resistance value of $6.0\times10^4\Omega$ or more and $5.0\times10^6\Omega$ or less. The surface layer contains a fluororesin and a (meth)acrylic resin, and has a relative permittivity of 10 or more and 22 or less and a resistance value of $1.2\times10^4\Omega$ or more and $8.8\times10^5\Omega$ or less.

16 Claims, 1 Drawing Sheet

(51) Int. Cl.

| | |
|---|---|
| ***C08K 3/04*** | (2006.01) |
| ***C08L 7/00*** | (2006.01) |
| ***C08L 9/00*** | (2006.01) |
| ***C09D 127/16*** | (2006.01) |
| ***C09D 127/18*** | (2006.01) |

(52) U.S. Cl.
CPC .................. *C08L 7/00* (2013.01); *C08L 9/00* (2013.01); *C09D 127/16* (2013.01); *C09D 127/18* (2013.01); *C08J 2307/00* (2013.01); *C08J 2309/00* (2013.01); *C08J 2427/16* (2013.01); *C08J 2427/18* (2013.01); *C08J 2433/12* (2013.01); *C08J 2435/04* (2013.01); *C08K 2201/011* (2013.01); *G03G 2215/025* (2013.01)

(58) Field of Classification Search
CPC ................ C08J 2309/00; C08J 2427/16; C08J 2427/18; C08J 2433/12; C08J 2435/04; C08K 3/04; C08K 2201/011; C08L 7/00; C08L 9/00; C09D 127/16; C09D 127/18
See application file for complete search history.

CHARGING ROLL FOR ELECTROPHOTOGRAPHIC APPARATUSES

CROSS-REFERENCE TO RELATED APPLICATION

The present application is a continuation of PCT/JP2024/009201, filed on Mar. 9, 2024, and is related to and claims priority from Japanese patent application no. 2023-053091, filed on Mar. 29, 2023. The entire contents of the aforementioned applications are hereby incorporated by reference herein.

TECHNICAL FIELD

The disclosure relates to a charging roll for electrophotographic apparatuses to be suitably used in electrophotographic apparatuses such as copiers, printers, and facsimiles that adopt an electrophotographic system.

RELATED ART

A charging roll of an electrophotographic apparatus is known to have a configuration including: a shaft body composed of a core bar or the like, an elastic body layer formed on the outer circumferential surface of the shaft body, and a surface layer formed on the outer circumferential surface of the elastic body layer. The elastic body layer is composed of a rubber material such as isoprene rubber, and the surface layer is composed of a resin material such as acrylic resin.

RELATED ART DOCUMENTS

Patent Documents

Patent Document 1: Japanese Patent Application Laid-Open No. 2003-140442

In a charging roll of an electrophotographic apparatus, a charging system that charges the photoreceptor by discharge from the charging roll to the photoreceptor is often adopted. However, to sufficiently charge the photoreceptor, if the discharge amount is increased, a lot of harmful substances such as ozone and NOx are generated, which may lead to environmental deterioration or image deterioration. On the other hand, if the discharge amount is small, the charge amount becomes insufficient, which may lead to image deterioration.

SUMMARY

A charging roll for electrophotographic apparatuses according to an embodiment of the disclosure includes: a shaft body, an elastic body layer formed on an outer circumferential surface of the shaft body, and a surface layer formed on an outer circumferential surface of the elastic body layer. The elastic body layer contains a non-polar rubber, a polar rubber, and a carbon black, and has a relative permittivity of 7 or more and 29 or less and a resistance value of $6.0\times10^4\Omega$ or more and $5.0\times10^6\Omega$ or less. The surface layer contains a fluororesin and a (meth)acrylic resin, and has a relative permittivity of 10 or more and 22 or less and a resistance value of $1.2\times10^4\Omega$ or more and $8.8\times10^5\Omega$ or less.

The non-polar rubber and the polar rubber may be present at a surface of the elastic body layer at an area ratio of non-polar rubber:polar rubber=9:1 to 7:3. The non-polar rubber may be isoprene rubber or natural rubber, and the polar rubber may be nitrile rubber or hydrin rubber. The carbon black may have an average particle diameter of 36 nm or more and 80 nm or less, and have a product of a DBP absorption amount and a specific surface area of 1728 or more and 5445 or less. The carbon black may be included at a content of 15 parts by mass or more and 50 parts by mass or less with respect to a total of 100 parts by mass of the non-polar rubber and the polar rubber. The elastic body layer may be composed of a composition that does not include an ionic conductive agent. The fluororesin and the (meth)acrylic resin may be included at a content ratio, by mass ratio, of fluororesin:(meth)acrylic resin=9.5:0.5 to 7:3. The fluororesin may have a relative permittivity of 8 or more and 10 or less and a volume resistivity of $1.0\times10^{13}$ Ω·cm or more and $1.0\times10^{14}$ Ω·cm or less. The fluororesin may be polyvinylidene fluoride. The fluororesin and the (meth)acrylic resin may have a difference in volume resistivity of 0.2 log Ω or less. The fluororesin may have an indentation Young's modulus of 0.65 GPa or more and 0.75 GPa or less and an elastic recovery rate of 40% or more and 50% or less, and the (meth)acrylic resin may have an indentation Young's modulus of 0.65 GPa or more and 0.75 GPa or less and an elastic recovery rate of 45% or more and 50% or less. The fluororesin and the (meth)acrylic resin may have a difference in indentation Young's modulus of 0.1 GPa or less, and have a difference in elastic recovery rate of 5% or less. The fluororesin may have a tensile strength of 28 MPa or more and 40 MPa or less. The fluororesin and the (meth)acrylic resin may have a difference in relative permittivity of 2 or less. The surface layer may further contain a roughness forming particle. The roughness forming particle may be a porous particle.

(1) A charging roll for electrophotographic apparatuses according to an embodiment of the disclosure includes: a shaft body, an elastic body layer formed on an outer circumferential surface of the shaft body, and a surface layer formed on an outer circumferential surface of the elastic body layer. The elastic body layer contains a non-polar rubber, a polar rubber, and a carbon black, and has a relative permittivity of 7 or more and 29 or less and a resistance value of $6.0\times10^4\Omega$ or more and $5.0\times10^6\Omega$ or less. The surface layer contains a fluororesin and a (meth)acrylic resin, and has a relative permittivity of 10 or more and 22 or less and a resistance value of $1.2\times10^4\Omega$ or more and $8.8\times10^5\Omega$ or less.

(2) In the (1), the non-polar rubber and the polar rubber may be present at a surface of the elastic body layer at an area ratio of non-polar rubber:polar rubber=9:1 to 7:3.

(3) In the (1) or the (2), the non-polar rubber may be isoprene rubber or natural rubber, and the polar rubber may be nitrile rubber or hydrin rubber.

(4) In any one of the (1) to the (3), the carbon black may have an average particle diameter of 36 nm or more and 80 nm or less, and have a product of a DBP absorption amount and a specific surface area of 1728 or more and 5445 or less.

(5) In any one of the (1) to the (4), the carbon black may be included at a content of 15 parts by mass or more and 50 parts by mass or less with respect to a total of 100 parts by mass of the non-polar rubber and the polar rubber.

(6) In any one of the (1) to the (5), the elastic body layer may be composed of a composition that does not include an ionic conductive agent.

(7) In any one of the (1) to the (6), the fluororesin and the (meth)acrylic resin may be included at a content ratio, by mass ratio, of fluororesin:(meth)acrylic resin=9.5:0.5 to 7:3.

(8) In any one of the (1) to the (7), the fluororesin may have a relative permittivity of 8 or more and 10 or less and a volume resistivity of $1.0\times10^{13}$ Ω·cm or more and $1.0\times10^{14}$ Ω·cm or less.

(9) In any one of the (1) to the (8), the fluororesin may be polyvinylidene fluoride.

(10) In any one of the (1) to the (9), the fluororesin and the (meth)acrylic resin may have a difference in volume resistivity of 0.2 log Ω or less.

(11) In any one of the (1) to the (10), the fluororesin may have an indentation Young's modulus of 0.65 GPa or more and 0.75 GPa or less and an elastic recovery rate of 40% or more and 50% or less, and the (meth)acrylic resin may have an indentation Young's modulus of 0.65 GPa or more and 0.75 GPa or less and an elastic recovery rate of 45% or more and 50% or less.

(12) In any one of the (1) to the (11), the fluororesin and the (meth)acrylic resin may have a difference in indentation Young's modulus of 0.1 GPa or less, and have a difference in elastic recovery rate of 5% or less.

(13) In any one of the (1) to the (12), the fluororesin may have a tensile strength of 28 MPa or more and 40 MPa or less.

(14) In any one of the (1) to the (13), the fluororesin and the (meth)acrylic resin may have a difference in relative permittivity of 2 or less.

(15) In any one of the (1) to the (14), the surface layer may further contain a roughness forming particle.

(16) In the (15), the roughness forming particle may be a porous particle.

According to the charging roll for electrophotographic apparatuses of an embodiment of the disclosure, the elastic body layer contains a non-polar rubber, a polar rubber, and a carbon black and has a relative permittivity of 7 or more and 29 or less and a resistance value of $6.0\times10^{4}$Ω or more and $5.0\times10^{6}$Ω or less, and the surface layer contains a fluororesin and a (meth)acrylic resin and has a relative permittivity of 10 or more and 22 or less and a resistance value of $1.2\times10^{4}$Ω or more and $8.8\times10^{5}$Ω or less. Thus, the discharge amount from the charging roll to the photoreceptor decreases, generation of harmful substances such as ozone and NOx is suppressed, and environmental deterioration and image deterioration resulting therefrom are suppressed. In addition, with the above configuration, movement of charge easily occurs at a grounded portion between the charging roll and the photoreceptor, and the photoreceptor can be charged to a desired charge amount by injecting charge from the charging roll to the photoreceptor. Accordingly, the charging property is excellent even with a reduced discharge amount.

Herein, when the area ratio of the non-polar rubber and the polar rubber at the surface of the elastic body layer is non-polar rubber:polar rubber=9:1 to 7:3, the relative permittivity of the elastic body layer is easily configured within a specific range.

Also, when the non-polar rubber is isoprene rubber or natural rubber, and the polar rubber is nitrile rubber or hydrin rubber, the relative permittivity of the elastic body layer is easily configured within a specific range.

Also, when the carbon black has an average particle diameter of 36 nm or more and 80 nm or less and has a product of a DBP absorption amount and a specific surface area of 1728 or more and 5445 or less, the carbon black is configured to the desired permittivity, and the relative permittivity of the elastic body layer is easily configured within a specific range.

Also, when the content of the carbon black is 15 parts by mass or more and 50 parts by mass or less with respect to a total of 100 parts by mass of the non-polar rubber and the polar rubber, the resistance value and the relative permittivity of the elastic body layer are easily configured within specific ranges.

Also, when the elastic body layer is composed of a composition that does not include an ionic conductive agent, the relative permittivity of the elastic body layer does not become excessively high, and the relative permittivity of the elastic body layer is easily configured within a specific range.

Also, when the content ratio of the fluororesin and the (meth)acrylic resin in mass ratio is fluororesin:(meth)acrylic resin=9.5:0.5 to 7:3, the relative permittivity of the surface layer is easily configured within a specific range.

Also, when the fluororesin has a relative permittivity of 8 or more and 10 or less and a volume resistivity of $1.0\times10^{13}$ Ω·cm or more and $1.0\times10^{14}$ Ω·cm or less, since the fluororesin has a relatively high permittivity and low resistance, the surface layer is easily configured to have a high permittivity and a low resistance. In addition, at this time, the effect of the charging property due to the fluororesin is also easily maintained.

Also, when the fluororesin is polyvinylidene fluoride, since the permittivity is high and the resistance is low relatively, the surface layer is easily configured to have a high permittivity and a low resistance. In addition, at this time, the effect of the charging property of the fluororesin is also easily maintained.

Also, when the difference in volume resistivity between the fluororesin and the (meth)acrylic resin is 0.2 log Ω or less, unevenness in injection of charge from the charging roll to the photoreceptor decreases.

Also, when the fluororesin has an indentation Young's modulus of 0.65 GPa or more and 0.75 GPa or less and an elastic recovery rate of 40% or more and 50% or less, and the (meth)acrylic resin has an indentation Young's modulus of 0.65 GPa or more and 0.75 GPa or less and an elastic recovery rate of 45% or more and 50% or less, deformation of the charging roll against the pressure received from the photoreceptor during rotation becomes uniform, and localized stress concentration is less likely to occur.

Also, when the difference in indentation Young's modulus between the fluororesin and the (meth)acrylic resin is 0.1 GPa or less, and the difference in elastic recovery rate is 5% or less, cracking of the surface layer due to physical stress received from the photoreceptor is easily suppressed. Accordingly, durability is improved.

Also, when the tensile strength of the fluororesin is 28 MPa or more and 40 MPa or less, the strength of the surface layer is improved, and durability is improved.

Also, when the difference in relative permittivity between the fluororesin and the (meth)acrylic resin is 2 or less, discharge unevenness from the charging roll to the photoreceptor decreases.

Also, when the surface layer further contains a roughness forming particle, a suitable discharge space can be formed between the photoreceptor and the charging roll. At this time, when the roughness forming particle is a porous particle, the binder resin of the surface layer and the roughness forming particle become more integrated, and the surface layer can be configured to be less likely to crack. In addition, the resistance can be integrated, and the injected charge can be configured to be uniform.

DESCRIPTION OF THE EMBODIMENTS

Embodiments of the disclosure provide a charging roll for electrophotographic apparatuses that is excellent in charging property even with a small discharge amount.

Figure 1A:
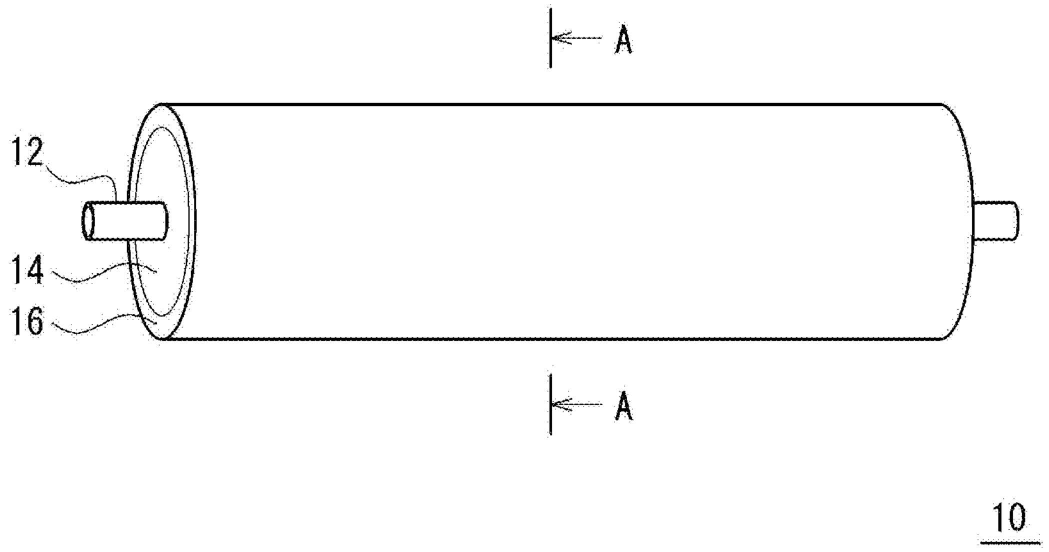
FIG. 1A is a schematic external view of a charging roll for electrophotographic apparatuses according to an embodiment of the disclosure.
Figure 1B:
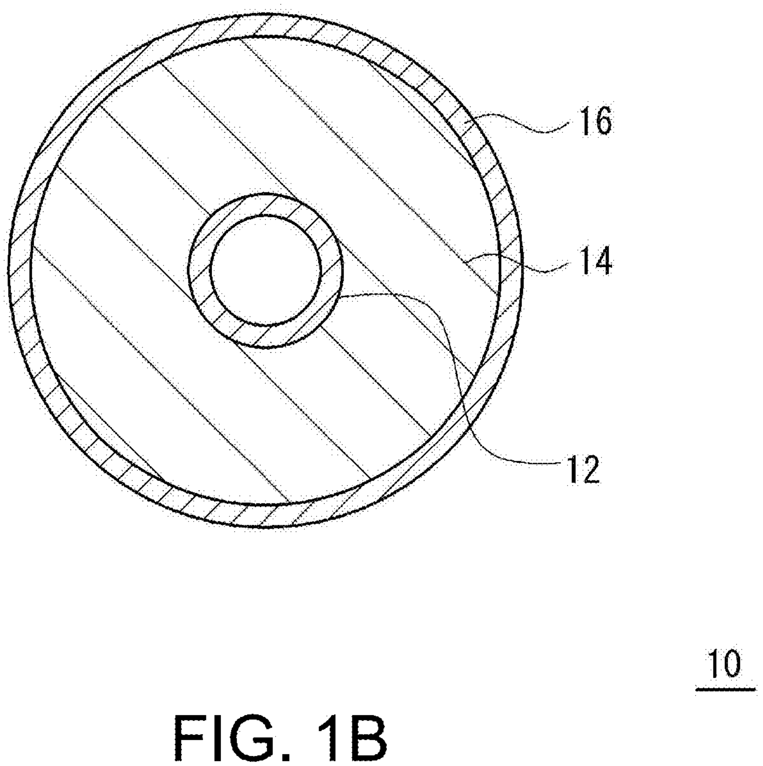
FIG. 1B is a cross-sectional view taken along line A-A thereof.

Hereinafter, a charging roll for electrophotographic apparatuses (which may be simply referred to as "charging roll" hereinafter) according to an embodiment of the disclosure will be described in detail. FIG. 1A is a schematic external view of a charging roll for electrophotographic apparatuses according to an embodiment of the disclosure, and FIG. 1B is a cross-sectional view taken along line A-A thereof.

A charging roll 10 includes a shaft body 12, an elastic body layer 14 formed on the outer circumferential surface of the shaft body 12, and a surface layer 16 formed on the outer circumferential surface of the elastic body layer 14. The elastic body layer 14 is a layer (base layer) that forms the base of the charging roll 10. The surface layer 16 is a layer that appears on the surface of the charging roll 10.

The shaft body 12 is not particularly limited as long as the shaft body 12 has conductivity. Specifically, examples may include a core bar or the like composed of a solid body or a hollow body made of a metal such as iron, stainless steel, aluminum, etc. An adhesive, a primer, etc. may be applied to the surface of the shaft body 12 as needed. That is, the elastic body layer 14 may be adhered to the shaft body 12 via an adhesive layer (primer layer). The adhesive, the primer, etc. may be made conductive as needed.

The elastic body layer 14 contains a non-polar rubber, a polar rubber, and a carbon black, and has a relative permittivity of 7 or more and 29 or less, and a resistance value of $6.0\times10^{4}\Omega$ or more and $5.0\times10^{6}\Omega$ or less.

Examples of the non-polar rubber of the elastic body layer 14 may include isoprene rubber (IR), hydrogenated isoprene rubber, natural rubber (NR), butadiene rubber (BR), styrene-butadiene rubber (SBR), butyl rubber (IIR), ethylene-propylene rubber (EPM), ethylene-propylene-diene terpolymer rubber (EPDM), silicone rubber (Q), etc. These rubbers may each be used alone as the non-polar rubber of the elastic body layer 14, or two or more of these rubbers may be combined and used. Among these rubbers, from the viewpoint of having high resistance and excellent effect as a dielectric phase, isoprene rubber and natural rubber are preferable.

Examples of the polar rubber of the elastic body layer 14 may include nitrile rubber (NBR), hydrin rubber, urethane rubber (U), acrylic rubber (copolymer of acrylic acid ester and 2-chloroethyl vinyl ether, ACM), chloroprene rubber (CR), etc. Examples of the hydrin rubber may include epichlorohydrin homopolymer (CO), epichlorohydrin-ethylene oxide binary copolymer (ECO), epichlorohydrin-allyl glycidyl ether binary copolymer (GCO), epichlorohydrin-ethylene oxide-allyl glycidyl ether ternary copolymer (GECO), etc. These rubbers may each be used alone as the polar rubber of the elastic body layer 14, or two or more of these rubbers may be combined and used. Among these rubbers, from the viewpoint of having lower resistance and higher relative permittivity, nitrile rubber (NBR) and hydrin rubber are preferable.

From the viewpoint of easily configuring the relative permittivity of the elastic body layer 14 within a specific range, as the combination of the non-polar rubber and the polar rubber, preferably, the non-polar rubber is isoprene rubber or natural rubber, and the polar rubber is nitrile rubber or hydrin rubber.

While depending on the mixing method, from the viewpoint of easily configuring the area ratio of the non-polar rubber and the polar rubber at the surface of the elastic body layer 14 within a specific range, the content ratio of the non-polar rubber and the polar rubber in mass ratio is preferably non-polar rubber:polar rubber=8:2 to 6:4, more preferably, non-polar rubber:polar rubber=8:2 to 7:3.

At the surface of the elastic body layer 14, the area ratio of the non-polar rubber and the polar rubber is preferably non-polar rubber:polar rubber=9:1 to 7:3. Accordingly, the relative permittivity of the elastic body layer 14 can be easily configured within a specific range. In addition, from this viewpoint, the area ratio is more preferably non-polar rubber:polar rubber=9:1 to 8:2.

The carbon black of the elastic body layer 14 contributes to the adjustment of the resistance value and the relative permittivity of the elastic body layer 14. From the viewpoint of easily configuring the resistance value and the relative permittivity of the elastic body layer 14 within specific ranges, preferably, the carbon black of the elastic body layer 14 has an average particle diameter of 36 nm or more and 80 nm or less, and the product of the DBP absorption amount (oil absorption amount) and the specific surface area is 1728 or more and 5445 or less. The product of the DBP absorption amount and the specific surface area is related to the amount of functional groups such as carbonyl groups and hydroxyl groups of the carbon black, and is related to the resistance value and the relative permittivity of the carbon black. The average particle diameter of the carbon black is represented by an arithmetic mean diameter obtained by observing the carbon black with an electron microscope. The DBP absorption amount of the carbon black is calculated from the amount of DBP (dibutyl phthalate) absorbed by 100 g of the carbon black in accordance with JIS K6221. The specific surface area of the carbon black is a value measured according to the BET method.

In addition, from the viewpoint of having a good balance between the resistance value and the relative permittivity, the DBP absorption amount of the carbon black of the elastic body layer 14 is preferably 69 $cm^3/100$ g or more and 121 $cm^3/100$ g or less. In addition, from the viewpoint of having an appropriate contact area with rubber, leading to high tolerance for variations in the addition amount and easily controlling the targeted resistance value and permittivity, the specific surface area of the carbon black of the elastic body layer 14 is preferably 45 $m^2/g$ or more and 58 $m^2/g$ or less.

In the elastic body layer 14, from the viewpoint of easily configuring the resistance value and the relative permittivity of the elastic body layer 14 within specific ranges, the content of the carbon black is preferably 15 parts by mass or more and 50 parts by mass or less with respect to 100 parts by mass of the total of the non-polar rubber and the polar rubber. The content is more preferably 20 parts by mass or more and 45 parts by mass or less, and even more preferably 25 parts by mass or more and 40 parts by mass or less.

The elastic body layer 14 may be composed of a composition that does not include an ionic conductive agent. With the elastic body layer 14 being composed of a composition that does not include an ionic conductive agent, the relative permittivity of the elastic body layer 14 does not become excessively high, and the relative permittivity of the elastic body layer 14 is easily configured within a specific range.

Various additives may be appropriately added to the elastic body layer 14 as needed. Examples of the additives may include a lubricant, a vulcanization accelerator, an anti-aging agent, a light stabilizer, a viscosity adjusting agent, a processing aid, a flame retardant, a plasticizer, a foaming agent, a filler, a dispersant, a defoaming agent, a pigment, a release agent, etc.

The thickness of the elastic body layer 14 is not particularly limited, and may be appropriately set within a range of 0.1 to 10 mm according to the application or the like.

The surface layer 16 contains a fluororesin and a (meth) acrylic resin, and has a relative permittivity of 10 or more and 22 or less, and a resistance value of $1.2 \times 10^4 \Omega$ or more and $8.8 \times 10^5 \Omega$ or less.

The fluororesin is preferably one with a relatively high permittivity and low resistance. The relative permittivity of the fluororesin is preferably 8 or more and 10 or less. In addition, the volume resistivity of the fluororesin is preferably $1.0 \times 10^{13}$ Ω·cm or more and $1.0 \times 10^{14}$ Ω·cm or less. With the relative permittivity and the volume resistivity of the fluororesin within the above ranges, since the fluororesin has a relatively high permittivity and low resistance, the surface layer 16 is easily configured to have a high relative permittivity and a low resistance. In addition, at this time, the effect of the charging property due to the fluororesin is also easily maintained.

As the fluororesin, polyvinylidene fluoride is preferable. With the fluororesin being polyvinylidene fluoride, since the permittivity is high and the resistance is low relatively, the surface layer is easily configured to have a high permittivity and a low resistance. In addition, at this time, the effect of the charging property due to the fluororesin is also easily maintained.

Herein, if the relative permittivity of the fluororesin is configured to be larger than the above range, the relative permittivity of the surface layer 16 can be configured to a desired value even when using the fluororesin alone. However, to configure the relative permittivity of the fluororesin to be larger than the above range, it is necessary to modify the fluororesin. Since modification reduces the effect of using the fluororesin, it is difficult to configure the relative permittivity of the surface layer 16 to a desired value with the fluororesin alone. Thus, in the surface layer 16, to configure the relative permittivity of the surface layer 16 to a desired value, (meth)acrylic resin is used together with the fluororesin. If the resin component of the surface layer 16 is the (meth)acrylic resin alone, since the relative permittivity becomes too high, it is difficult to configure the relative permittivity of the surface layer 16 to a desired value.

The (meth)acrylic resin is a resin selected from acrylic resin and methacrylic resin. Examples of the (meth)acrylic resin may include polymers (homopolymers or copolymers) of (meth)acrylate. The (meth)acrylate may be either monofunctional or multifunctional.

Examples of the monofunctional (meth)acrylate may include alkyl (meth)acrylate such as methyl (meth)acrylate, ethyl (meth)acrylate, propyl (meth)acrylate, butyl (meth) acrylate, isoamyl (meth)acrylate, 2-ethylhexyl (meth)acrylate, lauryl (meth)acrylate, stearyl (meth)acrylate, etc.; cycloalkyl (meth)acrylate such as cyclohexyl (meth)acrylate; (meth)acrylate having hydroxyl group such as 2-hydroxyethyl (meth)acrylate, 2-hydroxypropyl (meth)acrylate, 3-chloro-2-hydroxypropyl (meth)acrylate, etc.; alkoxyalkyl (meth)acrylate such as methoxyethyl (meth)acrylate, ethoxyethyl (meth)acrylate, butoxyethyl (meth)acrylate, etc.; phenoxyalkyl (meth)acrylate such as phenoxyethyl acrylate, nonylphenoxyethyl (meth)acrylate, etc.; and alkoxyalkylene glycol (meth)acrylate such as ethoxydiethylene glycol (meth)acrylate, methoxytriethylene glycol (meth)acrylate, methoxydipropylene glycol (meth)acrylate, etc.

Examples of the multifunctional (meth)acrylate may include alkyl diol di(meth)acrylate such as 1,9-nonanediol di(meth)acrylate, polyethylene glycol di(meth)acrylate such as diethylene glycol di(meth)acrylate, polypropylene glycol di(meth)acrylate such as dipropylene glycol di(meth)acrylate, trimethylolpropane tri(meth)acrylate, pentaerythritol tri(meth)acrylate, pentaerythritol tetra(meth)acrylate, glycerol tri(meth)acrylate, polyvalent (meth)acrylate obtained by addition reaction of a compound having ethylenic unsaturated bond and active hydrogen such as unsaturated carboxylic acid or unsaturated alcohol to ethylene glycol diglycidyl ether, polyvalent (meth)acrylate obtained by addition reaction of a compound having active hydrogen such as carboxylic acid or amine with unsaturated epoxy compound such as glycidyl (meth)acrylate, polyvalent (meth)acrylamide such as methylene bis(meth)acrylamide, polyvalent vinyl compound such as divinylbenzene, etc.

From the viewpoints of the relative permittivity, the volume resistivity, the indentation Young's modulus, the elastic recovery rate, etc., the (meth)acrylic resin is more preferably a methacrylic resin. In addition, from the viewpoints of the relative permittivity, the volume resistivity, the indentation Young's modulus, the elastic recovery rate, etc., the (meth)acrylic resin is more preferably alkyl (meth) acrylate and cycloalkyl (meth)acrylate.

The content ratio of the fluororesin and the (meth)acrylic resin in mass ratio may be fluororesin:(meth)acrylic resin=9.5:0.5 to 7:3. Accordingly, the relative permittivity of the surface layer 16 is easily configured within a specific range. The above content ratio is more preferably fluororesin:(meth)acrylic resin=9:1 to 7:3, and even more preferably fluororesin:(meth)acrylic resin=8:2 to 7:3.

In addition, the difference in relative permittivity between the fluororesin and the (meth)acrylic resin may be 2 or less. Accordingly, discharge unevenness from the charging roll 10 to the photoreceptor decreases. In addition, the difference in volume resistivity between the fluororesin and the (meth) acrylic resin may be 0.2 log Ω or less. Accordingly, unevenness in injection of charge from the charging roll 10 to the photoreceptor decreases.

Herein, the indentation Young's modulus of the fluororesin is preferably 0.65 GPa or more and 0.75 GPa or less, and the elastic recovery rate is preferably 40% or more and 50% or less. The indentation Young's modulus of the (meth)acrylic resin is preferably 0.65 GPa or more and 0.75 GPa or less, and the elastic recovery rate is preferably 45% or more and 50% or less. Accordingly, the deformation of the charging roll 10 against the pressure received from the photoreceptor during rotation becomes uniform, and localized stress concentration is less likely to occur. In addition, the difference in indentation Young's modulus between the fluororesin and the (meth)acrylic resin may be 0.1 GPa or less, and the difference in elastic recovery rate may be 5% or less. Accordingly, cracking of the surface layer 16 due to physical stress received from the photoreceptor is easily suppressed, and durability is improved. The indentation Young's modulus may be measured using a micro-indentation hardness tester on a sheet-shaped sample. The elastic recovery rate may be measured using a tensile testing machine on a sheet-shaped sample.

The fluororesin may have a tensile strength of 28 MPa or more and 40 MPa or less. Accordingly, the strength of the surface layer 16 is improved, and durability is improved. The tensile strength of the fluororesin may be measured with an elongation at break using a tensile testing machine on a sheet-shaped sample.

The surface layer 16 may include a roughness forming particle. The roughness forming particle is a particle for imparting roughness to the surface of the surface layer 16. In other words, the roughness forming particle is a particle for imparting unevenness to the surface of the surface layer 16. The surface unevenness of the surface layer 16 forms a discharge space between the photoreceptor and the charging roll 10.

The roughness forming particle may be a resin particle, an inorganic particle, etc. The roughness forming particle may be a solid particle or may be a porous particle. With the roughness forming particle being a porous particle, the fluororesin or the (meth)acrylic resin, which is the binder resin of the surface layer 16, and the roughness forming particle can be more integrated, and the surface layer 16 can be configured to be less likely to crack. In addition, the resistance can be integrated, and the injected charge can be configured to be uniform.

Examples of the material of the roughness forming particle may include urethane resin, polyamide resin, (meth) acrylic resin, (meth)acrylic silicone resin, silicone-grafted (meth)acrylic polymer, (meth)acrylic-grafted silicone polymer, urethane rubber, silica, etc. Among these materials, from the viewpoints of affinity, integration, etc. with the binder resin of the surface layer 16, (meth)acrylic resin is more preferable.

Although the size of the roughness forming particle is not particularly limited, from the viewpoint of easily ensuring uniform charging property, a roughness forming particle with an average particle diameter of 3.0 μm or more and 50 μm or less is preferable. More preferably, a roughness forming particle with an average particle diameter of 5.0 μm or more and 30 μm or less is preferable. Observing the surface of the surface layer 16 with a laser microscope, and taking the diameter of the roughness forming particle visible during surface observation as the particle diameter, the average particle diameter of the roughness forming particle is expressed as an average of any 20 points.

Although the content of the roughness forming particle in the surface layer 16 is not particularly limited, from the viewpoint of easily ensuring uniform charging property, the content is preferably 3 parts by mass or more and 50 parts by mass or less with respect to 100 parts by mass of the binder resin of the surface layer 16. The content is more preferably 5 parts by mass or more and 30 parts by mass or less.

Various additives may be appropriately added to the surface layer 16 as needed.

The thickness of the surface layer 16 is not particularly limited, and may be set within a range of 0.1 to 3.0 μm. The thickness of the surface layer 16 may be measured by observing the cross-section using a laser microscope (e.g., "VK-9510" manufactured by Keyence). For example, the distance from the surface of the elastic body layer 14 to the surface of the surface layer 16 may be measured respectively at 5 spots of any positions, and the thickness may be expressed by an average thereof.

The charging roll 10 may be produced by forming the elastic body layer 14 on the outer circumferential surface of the shaft body, and forming the surface layer 16 on the outer circumferential surface of the elastic body layer 14.

The elastic body layer 14 may be formed, for example, as follows. First, the shaft body 12 is coaxially disposed in a hollow part of a roll molding mold, an uncrosslinked elastic body layer forming composition is injected, is heated and cured (crosslinked), and then is demolded, or an uncrosslinked elastic body layer forming composition is extrusion-molded on the surface of the shaft body 12 to form the elastic body layer 14 on the outer circumference of the shaft body.

To form the surface layer 16, a surface layer forming composition is used. The surface layer forming composition is composed of the above main materials and other additives that are included as needed.

From the viewpoint of adjusting the viscosity, the surface layer forming composition may appropriately contain a solvent such as an organic solvent including methyl ethyl ketone, toluene, acetone, ethyl acetate, butyl acetate, methyl isobutyl ketone (MIBK), THF, DMF, etc., or a water-soluble solvent such as methanol, ethanol, etc.

The surface layer 16 may be formed by a method such as coating the surface layer forming composition on the outer circumferential surface of the elastic body layer 14. As the coating method, various coating methods such as a roll coating method, a dipping method, a spray coating method, etc. may be applied. The coated surface layer 16 may be subjected to ultraviolet irradiation or heat treatment as needed.

In the charging roll 10 of the above configuration, the elastic body layer 14 contains a non-polar rubber, a polar rubber, and carbon black and has a relative permittivity of 7 or more and 29 or less and a resistance value of $6.0\times10^4\Omega$ or more and $5.0\times10^6\Omega$ or less, and the surface layer 16 contains a fluororesin and a (meth)acrylic resin and has a relative permittivity of 10 or more and 22 or less and a resistance value of $1.2\times10^4\Omega$ or more and $8.8\times10^5\Omega$ or less. Thus, the discharge amount from the charging roll 10 to the photoreceptor decreases, generation of harmful substances such as ozone and NOx is suppressed, and environmental deterioration and image deterioration resulting therefrom are suppressed. In addition, with the above configuration, movement of charge easily occurs at the grounded portion between the charging roll 10 and the photoreceptor, and by injecting charge from the charging roll 10 to the photoreceptor, the photoreceptor can be charged to a desired charge amount. Accordingly, the charging property is excellent even with a reduced discharge amount.

If the relative permittivity of the surface layer 16 or the elastic body layer 14 is too high beyond a specific range, too much charge is stored, and movement of charge at a contact part from the charging roll 10 to the photoreceptor is less likely to occur. On the other hand, if the relative permittivity is too low below the specific range, discharge from the charging roll 10 to the photoreceptor increases, and generation of harmful substances such as ozone and NOx increases. In addition, if the resistance value of the surface layer 16 or the elastic body layer 14 is too high beyond a specific range, movement of charge at the contact part from the charging roll 10 to the photoreceptor is less likely to occur. On the other hand, if the resistance value is too low below the specific range, discharge from the charging roll 10 to the photoreceptor increases, and generation of harmful substances such as ozone and NOx increases.

In addition, from the above viewpoint, the relative permittivity of the elastic body layer 14 is more preferably 10 or more, 15 or more, and is 25 or less, 20 or less. The resistance value of the elastic body layer 14 is more preferably $8.0\times10^4\Omega$ or more, $1.0\times10^5\Omega$ or more, and is $1.0\times10^6\Omega$ or less, $5.0\times10^5\Omega$ or less. Similarly, the relative permittivity of the surface layer 16 is more preferably 12 or more, 14 or more, and is 20 or less, 18 or less. The resistance value of the surface layer 16 is more preferably $2.0\times10^4\Omega$ or more, $5.0\times10^4\Omega$ or more, and is $8.0\times10^5\Omega$ or less, $5.0\times10^5\Omega$ or less.

To configure the relative permittivity and the resistance value of the elastic body layer 14 within the above ranges, the non-polar rubber may be taken as a base with a small amount of the polar rubber used, and selection of the carbon black may be performed. The combination of the non-polar rubber and the polar rubber may be selected from suitable combinations mentioned above. Since the non-polar rubber and the polar rubber have low compatibility, the area ratio at the surface is important as a content ratio. By configuring the area ratio within the specific range mentioned above, the relative permittivity of the elastic body layer 14 is easily configured within the specific range. For the carbon black, the average particle diameter and the product of the DBP absorption amount and the specific surface area are important factors, and particularly, the product of the DBP absorption amount and the specific surface area, which is an indicator of the relative permittivity of the carbon black, may be suitably selected.

To configure the relative permittivity and the resistance value of the surface layer 16 within the above ranges, a fluororesin with a relatively high permittivity and a lower resistance may be selected as a base, and a small amount of a (meth)acrylic resin which has a higher permittivity than the fluororesin may be used. The fluororesin is preferably one having the specific relative permittivity and volume resistivity mentioned above. By configuring the content ratio of the fluororesin and the (meth)acrylic resin within the specific range mentioned above, the relative permittivity of the surface layer 16 is easily configured within the specific range. By selecting a fluororesin and a (meth)acrylic resin with similar indentation Young's moduli and elastic recovery rates, cracking of the surface layer 16 due to physical stress received from the photoreceptor is suppressed, and durability is improved.

EXAMPLES

Hereinafter, the disclosure will be described in detail using Examples and Comparative Examples.

Examples 1 to 7, Comparative Examples 1 to 10

<Preparation of Elastic Body Layer Forming Composition>

The polar rubber, the non-polar rubber, and the carbon black were blended in the blending ratio (parts by mass) shown in the table, a peroxide crosslinking agent, a vulcanization aid, and a catalyst were added, and these were stirred and mixed using a stirrer to prepare an elastic body layer forming composition.

<Production of Elastic Body Layer>

A core bar (diameter 8 mm) was set in a molding die (pipe-shaped), the elastic body layer forming composition was injected, heated at 180° C. for 30 minutes, then cooled and demolded to form an elastic body layer with a thickness of 1.9 mm on the outer circumference of the core bar.

<Preparation of Surface Layer Forming Composition>

The fluororesin, the (meth)acrylic resin, the carbon black, and the roughness forming particle were blended in the blending ratio (parts by mass) shown in the table, diluted with methyl ethyl ketone (MEK), and mixed and stirred at a specific stirring speed to prepare a surface layer forming composition.

<Production of Surface Layer>

While continuing stirring the surface layer forming composition, the surface layer forming composition was roll-coated onto the outer circumferential surface of the elastic body layer, and by applying a heat treatment, a surface layer with a thickness of 1.0 μm was formed on the outer circumference of the elastic body layer. Accordingly, a charging roll was produced.

The following materials were prepared as materials of the elastic body layer forming composition.

(Polar Rubber)

Polar rubber <1> (NBR): "Nipol 1041" manufactured by Zeon Corporation

Polar rubber <2> (ECO): "Hydrin H1100" manufactured by Zeon Corporation

Polar rubber <3> (CR): "Denka Chloroprene DCR-107" manufactured by Denka (Non-Polar Rubber)

Non-polar rubber <1> (IR): "Nipol IR2200" manufactured by Zeon Corporation

Non-polar rubber <2> (NR): "GW540N" manufactured by Maxell Kureha

Non-polar rubber <3> (BR): "UBEPOL BR130B" manufactured by UBE Elastomer (Carbon Black)

Carbon black <1>: "Mitsubishi Carbon Black #25" manufactured by Mitsubishi Chemical, average particle diameter 47 nm, oil absorption amount (DBP absorption amount) 69 $cm^3$/100 g, specific surface area 55 $m^2$/g Carbon black <2>: "Mitsubishi Carbon Black #20" manufactured by Mitsubishi Chemical, average particle diameter 50 nm, oil absorption amount (DBP absorption amount) 121 $cm^3$/100 g, specific surface area 45 $m^2$/g Carbon black <3>: "TOKABLACK #7270SB" manufactured by Tokai Carbon, average particle diameter 36 nm, oil absorption amount (DBP absorption amount) 62 $cm^3$/100 g, specific surface area 58 $m^2$/g Carbon black <4>: "Diablack G" manufactured by Mitsubishi Chemical, average particle diameter 80 nm, oil absorption amount (DBP absorption amount) 84 $cm^3$/100 g, specific surface area 28 $m^2$/g Carbon black <5>: "HTC #SSRF" manufactured by Nippon Steel Carbon, average particle diameter 68 nm, oil absorption amount (DBP absorption amount) 72 $cm^3$/100 g, specific surface area 24 $m^2$/g Carbon black <6>: "Asahi #70L" manufactured by Asahi Carbon, average particle diameter 25 nm, oil absorption amount (DBP absorption amount) 85 $cm^3$/100 g, specific surface area 75 $m^2$/g The following materials were prepared as materials of the surface layer forming composition.

(Fluororesin)

Fluororesin <1> (PVDF): "Kynar 711" manufactured by Arkema, volume resistivity $1.0\times10^{14}$ Ω·cm, relative permittivity 8, indentation Young's modulus 0.65 GPa, elastic recovery rate 40%

Fluororesin <2> (PVDF): "Kynar HSV900" manufactured by Arkema, volume resistivity $1.0\times10^{13}$ Ω·cm, relative permittivity 10, indentation Young's modulus 0.75 GPa, elastic recovery rate 50%

Fluororesin <3> (PTFE+PFA): "Neoflon PFA AP-230AS" manufactured by Daikin Industries, volume resistivity $1.4\times10^{13}$ Ω·cm, relative permittivity 8.2, indentation Young's modulus 0.71 GPa, elastic recovery rate 48%

Fluororesin <4> (PVDF): "KF Polymer #1000" manufactured by Kureha, volume resistivity $2.1\times10^{14}$ Ω·cm, relative permittivity 7.6, indentation Young's modulus 0.72 GPa, elastic recovery rate 40%

((Meth)Acrylic Resin)

(Meth)acrylic resin <1> (PMMA): "Dianal BR107" manufactured by Mitsubishi Chemical, relative permittivity 10, indentation Young's modulus 0.65 GPa, elastic recovery rate 50%

(Meth)acrylic resin <2> (PMMA): "Acrypet IRH50001" manufactured by Mitsubishi Chemical, relative permittivity 11, indentation Young's modulus 0.75 GPa, elastic recovery rate 40%

(Carbon Black)

Carbon black: "9027BLACK" manufactured by Tokushiki (Roughness Forming Particle)

Roughness forming particle <1> (PMMA): "Techpolymer MBP-8" manufactured by Sekisui Kasei, average particle diameter 8 μm, porous particle Roughness forming particle <2> (PMMA): "Chemisnow MZ-8HN" manufactured by Soken Chemical, average particle diameter 8 μm, solid particle (Method of Producing Samples)

The resin (fluororesin or acrylic resin) was added to a mixed solvent of acetone and water (9:1) to 5 wt %, dissolved by blade stirring for 24 hr, then cast in an environment of 28° C.×60% RH, and thereafter underwent baking at 100° C. for 30 min, to produce measurement samples (sheet-shaped) composed of each resin.

(Methods of Measuring Physical Properties of Samples)

(Volume Resistivity)

The volume resistivity of the obtained sheet-shaped sample was measured in accordance with JIS K7194, using resistance meter RM3545 manufactured by HIOKI and 4-point probe RM9010-01 manufactured by HIOKI.

(Permittivity)

The obtained sheet-shaped sample was measured in accordance with JIS C2138, by applying 10 kHz using precision LCR meter E4980A (manufactured by Agilent Technologies).

(Indentation Young's Modulus)

The indentation Young's modulus of the obtained sheet-shaped sample was measured based on the nanoindentation method, using ultra-micro indentation hardness tester (Nanoindentation Tester: ENT-1100a manufactured by Elionix).

(Elastic Recovery Rate)

The elastic recovery rate of the obtained sheet-shaped sample was measured in accordance with JIS K6251, using a tensile testing machine ("AE-F Strograph" manufactured by Toyo Seiki Seisaku-sho).

(Tensile Strength)

The elongation at break of the obtained sheet-shaped sample was measured in accordance with JIS K6251, using a tensile testing machine ("AE-F Strograph" manufactured by Toyo Seiki Seisaku-sho).

(Relative Permittivity of Elastic Body Layer)

The elastic body layer before forming the surface layer was cut out as a sample piece of 1 cm×1 cm×0.3 cm, and the obtained sheet-shaped sample was measured in accordance with JIS C2138 by applying 10 kHz using precision LCR meter E4980A (manufactured by Agilent Technologies).

(Relative Permittivity of Surface Layer)

The surface layer forming composition was cast under an environment of 28° C.×60% RH, and then underwent baking at 100° C. for 30 min to produce a measurement sample (sheet-shaped) composed of the surface layer forming composition. The obtained sheet-shaped sample was measured in accordance with JIS C2138 by applying 10 kHz using precision LCR meter E4980A (manufactured by Agilent Technologies).

(Resistance Value of Elastic Body Layer)

The elastic body layer before forming the surface layer was cut out as a sample piece of 1 cm×1 cm×0.3 cm, and the resistance value of the obtained sheet-shaped sample was measured in accordance with JIS K7194, using resistance meter RM3545 manufactured by HIOKI and 4-point probe RM9010-01 manufactured by HIOKI.

(Resistance Value of Surface Layer)

The surface layer forming composition was cast under an environment of 28° C.×60% RH, and then underwent baking at 100° C. for 30 min to produce a measurement sample (sheet-shaped) composed of the surface layer forming composition. The resistance value of the obtained sheet-shaped sample was measured in accordance with JIS K7194, using resistance meter RM3545 manufactured by HIOKI and 4-point probe RM9010-01 manufactured by HIOKI.

(Surface Existence Area Ratio of Rubber)

The elastic body layer before forming the surface layer was cut out as a sample piece of 11 cm×1 cm×0.3 cm, and after being stained according to the Os staining method, the sample piece was observed at 2000 magnification using a scanning electron microscope. Since the darker color portion and the lighter color portion respectively represent the existence of rubbers by Os staining, the occupied areas were measured.

(Evaluation/Determination Methods)

The produced charging roll was attached to a unit (black) of an actual machine ("IM C8000" manufactured by RICOH), image output was performed with 25% density halftone under an environment of 10° C.×10% RH, and evaluation was performed after a 1 million sheet durability test.

(Black and White Spots): Charging Property (Discharge Amount)

Those with no white spots or black spots in the image were rated as very good "◎", those with spots at several positions but with a density being low within an acceptable range were rated as good "○", and those with numerous spots with a high density were rated as unacceptable "×".

(Fogging): Charging Property (Charge Amount)

Those with no fogging in the image were rated as very good "◎", those with fogging at several positions but with a density being low within an acceptable range were rated as good "○", and those with much fogging with a high density were rated as unacceptable "×".

(Unevenness): Anti-Fouling Property

Those with no unevenness in the image were rated as very good "◎", those with unevenness which was light within an acceptable range were rated as good "○", and those with dark unevenness in the image were rated as unacceptable "×".

(Cracks): Durability

Those with no cracks on the roll surface were rated as very good "◎", and those with cracks at several positions but with no effect on the image were rated as good "○".

TABLE 1

| | | Particle diameter nm | Oil absorption amount $cm^3$/100 g | Specific surface area $m^2$/g | Oil absorption amount × specific surface area | Example 1 | Example 2 | Example 3 |
|---|---|---|---|---|---|---|---|---|
| Elastic body layer | Polar rubber <1> NBR | | | | | 20 | 38 | — |
| | Polar rubber <2> ECO | | | | | — | — | — |
| | Polar rubber <3> CR | | | | | — | — | 2.5 |
| | Non-polar rubber <1> IR | | | | | 80 | 62 | — |
| | Non-polar rubber <2> NR | | | | | — | — | — |
| | Non-polar rubber <3> BR | | | | | — | — | 75 |
| | Carbon black <1> | 47 | 69 | 55 | 3.795 | 15 | 50 | 53 |
| | Carbon black <2> | 50 | 121 | 45 | 5.445 | — | — | — |
| | Carbon black <3> | 36 | 62 | 58 | 3.596 | — | — | — |
| | Carbon black <4> | 80 | 84 | 28 | 2.352 | — | — | — |
| | Carbon black <5> | 68 | 72 | 24 | 1.728 | — | — | — |
| | Carbon black <6> | 25 | 85 | 75 | 6.375 | — | — | — |
| | | Relative permittivity of elastic body layer | | | | 7 | 29 | 22 |
| | | Resistance value (Ω) of elastic body layer | | | | $5.0 \times 10^{6}$ | $6.0 \times 10^{4}$ | $6.1 \times 10^{4}$ |
| | | Surface existence area ratio of rubber (non-polar:polar) | | | | 9:1 | 7:3 | 7.5:2.5 |

| | | Relative permit-tivity | Volume resistivity Ω · cm | Young's modulus GPa | Recovery rate % | Tensile strength MPa | Example 1 | Example 2 | Example 3 |
|---|---|---|---|---|---|---|---|---|---|
| Surface layer | Fluororesin <1> PVDF | 8 | $1.0 \times 10^{14}$ | 0.65 | 40 | 28 | 95 | — | — |
| | Fluororesin <2> PVDF | 10 | $1.0 \times 10^{13}$ | 0.75 | 50 | 40 | — | 70 | — |
| | Fluororesin <3> PTFE + PFA | 8.2 | $1.4 \times 10^{13}$ | 0.71 | 48 | 35 | — | — | 80 |
| | Flororesin <4> PVDF | 7.6 | $2.1 \times 10^{14}$ | 0.72 | 40 | 40 | — | — | — |
| | (Meth)acrylic resin <1> PMMA | 10 | | 0.65 | 45 | | 5 | — | — |
| | (Meth)acrylic resin <2> PMMA | 11 | | 0.75 | 50 | | — | 30 | 20 |
| | Carbon black | | | | | | 20 | 60 | 40 |
| | Roughness forming particle <1> porous | | | | | | 30 | 30 | 30 |
| | Roughness forming particle <2> solid | | | | | | — | — | — |
| Relative permittivity of surface layer | | | | | | | 10 | 22 | 16 |
| Resistance value (Ω) of surface layer | | | | | | | $8.8 \times 10^{5}$ | $1.2 \times 10^{4}$ | $2.3 \times 10^{4}$ |
| Resistance difference between materials logΩ | | | | | | | 0.2 | 0.1 | 0.13 |
| Young's modulus difference between materials GPa | | | | | | | 0 | 0 | 0.04 |
| Elastic recovery rate difference between materials % | | | | | | | 5 | 0 | 2 |
| Relative permittivity difference between materials | | | | | | | 2 | 1 | 2.8 |

TABLE 1-continued

| | | | | | |
|---|---|---|---|---|---|
| Evaluation | Charging property (discharge amount) | black and white spots | ◎ | ◎ | ○ |
| | Charging property (charge amount) | fogging | ◎ | ◎ | ◎ |
| | Anti-fouling property | unevenness | ◎ | ◎ | ◎ |
| | Durability | cracks | ◎ | ◎ | ○ |

| | | Example | | | |
|---|---|---|---|---|---|
| | | 4 | 5 | 6 | 7 |
| Elastic body layer | Polar rubber <1> NBR | 25 | — | 36 | 36 |
| | Polar rubber <2> ECO | — | 25 | — | — |
| | Polar rubber <3> CR | — | — | — | — |
| | Non-polar rubber <1> IR | 75 | 75 | — | 64 |
| | Non-polar rubber <2> NR | — | — | 64 | — |
| | Non-polar rubber <3> BR | — | — | — | — |
| | Carbon black <1> | — | — | — | — |
| | Carbon black <2> | 30 | — | — | — |
| | Carbon black <3> | — | 40 | — | — |
| | Carbon black <4> | — | — | 13 | — |
| | Carbon black <5> | — | — | — | 30 |
| | Carbon black <6> | — | — | — | — |
| | Relative permittivity of elastic body layer | 20 | 18 | 10 | 14 |
| | Resistance value (Ω) of elastic body layer | $1.0 \times 10^5$ | $8.1 \times 10^4$ | $4.9 \times 10^6$ | $1.2 \times 10^5$ |
| | Surface existence area ratio of rubber (non-polar:polar) | 8:2 | 8:2 | 7.5:2.5 | 7.5:2.5 |
| Surface layer | Fluororesin <1> PVDF | — | 75 | 97 | — |
| | Fluororesin <2> PVDF | 75 | — | — | 65 |
| | Fluororesin <3> PTFE + PFA | — | — | — | — |
| | Flororesin <4> PVDF | — | — | — | — |
| | (Meth)acrylic resin <1> PMMA | 25 | 25 | 3 | — |
| | (Meth)acrylic resin <2> PMMA | — | — | — | 35 |
| | Carbon black | 40 | 40 | 40 | 45 |
| | Roughness forming particle <1> porous | — | 30 | 20 | 30 |
| | Roughness forming particle <2> solid | 30 | — | — | — |

TABLE 1-continued

| | | | | | |
|---|---|---|---|---|---|
| Relative permittivity of surface layer | | 17 | 14 | 11 | 19 |
| Resistance value (Ω) of surface layer | | $1.3 \times 10^5$ | $4.3 \times 10^4$ | $7.2 \times 10^5$ | $4.3 \times 10^4$ |
| Resistance difference between materials logΩ | | 0.13 | 0.2 | 0.2 | 0.2 |
| Young's modulus difference between materials GPa | | 0.1 | 0 | 0 | 0 |
| Elastic recovery rate difference between materials % | | 5 | 5 | 5 | 0 |
| Relative permittivity difference between materials | | 0 | 2 | 2 | 1 |
| Evaluation | Charging property (discharge amount) | ◎ | ◎ | ◎ | ◎ |
| | Charging property (charge amount) | ◎ | ◎ | ○ | ◎ |
| | Anti-fouling property | ◎ | ◎ | ◎ | ○ |
| | Durability | ○ | ○ | ○ | ◎ |

TABLE 2

| | | Particle diameter nm | Oil absorption amount $cm^3/100$ g | Specific surface area $m^2/g$ | Oil absorption amount × specific surface area | Comparative Example 1 | Comparative Example 2 | Comparative Example 3 | Comparative Example 4 |
|---|---|---|---|---|---|---|---|---|---|
| Elastic body layer | Polar rubber <1> NBR | | | | | 10 | 20 | 43 | 36 |
| | Polar rubber <2> ECO | | | | | — | — | — | — |
| | Polar rubber <3> CR | | | | | — | — | — | — |
| | Non-polar rubber <1> IR | | | | | 90 | 80 | 67 | 64 |
| | Non-polar rubber <2> NR | | | | | — | — | — | — |
| | Non-polar rubber <3> BR | | | | | — | — | — | — |
| | Carbon black <1> | 47 | 69 | 55 | 3.795 | 25 | 5 | 58 | 60 |
| | Carbon black <2> | 50 | 121 | 45 | 5.445 | — | — | — | — |
| | Carbon black <3> | 36 | 62 | 58 | 3.596 | — | — | — | — |
| | Carbon black <4> | 80 | 84 | 28 | 2.352 | — | — | — | — |
| | Carbon black <5> | 68 | 72 | 24 | 1.728 | — | — | — | — |
| | Carbon black <6> | 25 | 85 | 75 | 6.375 | — | — | — | — |
| | Relative permittivity of elastic body layer | | | | | 6 | 8 | 31 | 16 |
| | Resistance value (Ω) of elastic body layer | | | | | $4.1 \times 10^6$ | $6.1 \times 10^6$ | $7.3 \times 10^4$ | $4.4 \times 10^4$ |
| | Surface existence area ratio of rubber (non-polar:polar) | | | | | 9.4:0.6 | 9:1 | 6.5:3.5 | 7.3:2.3 |
| | | Relative permittivity | Volume resistivity Ω · cm | Young's modulus GPa | Recovery rate % | Tensile strength MPa | | | |
| Surface layer | Fluororesin <1> PVDF | 8 | $1.0 \times 10^{14}$ | 0.65 | 40 | 28 | 75 | 75 | 75 | 75 |
| | Flororesin <2> PVDF | 10 | $1.0 \times 10^{13}$ | 0.75 | 50 | 40 | — | — | — | — |
| | Fluororesin <3> PTFE + PFA | 8.2 | $1.4 \times 10^{13}$ | 0.71 | 48 | 35 | — | — | — | — |
| | Fluororesin <4> PVDF | 7.6 | $2.1 \times 10^{14}$ | 0.72 | 40 | 40 | — | — | — | — |
| | (Meth)acrylic resin <1> PMMA | 10 | | 0.65 | 45 | | 25 | 25 | 25 | 25 |

TABLE 2-continued

| | | | | | | | | |
|---|---|---|---|---|---|---|---|---|
| | (Meth)acrylic resin <2> PMMA | 11 | 0.75 | 50 | — | — | — | — |
| | Carbon black | | | | 40 | 40 | 40 | 40 |
| | Roughness forming particle <1> porous | | | | 30 | 30 | 30 | 30 |
| | Roughness forming particle <2> solid | | | | — | — | — | — |
| | | Relative permittivity of surface layer | | | 14 | 14 | 14 | 14 |
| | | Resistance value (Ω) of surface layer | | | $4.3 \times 10^4$ | $4.3 \times 10^4$ | $4.3 \times 10^4$ | $4.3 \times 10^4$ |
| | | Resistance difference between materials logΩ | | | 0.2 | 0.2 | 0.2 | 0.2 |
| | | Young's modulus difference between materials GPa | | | 0 | 0 | 0 | 0 |
| | | Elastic recovery rate difference between materials % | | | 5 | 5 | 5 | 5 |
| | | Relative permittivity difference between materials | | | 2 | 2 | 2 | 2 |
| Evaluation | Charging property (discharge amount) | black and white spots | | | X | ◎ | ◎ | X |
| | Charging property (charge amount) | fogging | | | ◎ | X | X | ◎ |
| | Anti-fouling property | unevenness | | | ◎ | ◎ | ◎ | ◎ |
| | Durability | cracks | | | ○ | ◎ | ◎ | ◎ |

| | | Comparative Example 5 | 6 | 7 | 8 | 9 | 10 |
|---|---|---|---|---|---|---|---|
| Elastic body layer | Polar rubber <1> NBR | 36 | 36 | 36 | 36 | 38 | 36 |
| | Polar rubber <2> ECO | — | — | — | — | — | — |
| | Polar rubber <3> CR | — | — | — | — | — | — |
| | Non-polar rubber <1> IR | 64 | 64 | 64 | 64 | 62 | 64 |
| | Non-polar rubber <2> NR | — | — | — | — | — | — |
| | Non-polar rubber <3> BR | — | — | — | — | — | — |
| | Carbon black <1> | 40 | 40 | 40 | 40 | — | 40 |
| | Carbon black <2> | — | — | — | — | — | — |
| | Carbon black <3> | — | — | — | — | — | — |
| | Carbon black <4> | — | — | — | — | — | — |
| | Carbon black <5> | — | — | — | — | — | — |
| | Carbon black <6> | — | — | — | — | 55 | — |
| | Relative permittivity of elastic body layer | 14 | 14 | 14 | 14 | 31 | 14 |
| | Resistance value (Ω) of elastic body layer | $1.2 \times 10^5$ | $1.2 \times 10^5$ | $1.2 \times 10^5$ | $1.2 \times 10^5$ | $4.3 \times 10^4$ | $1.2 \times 10^5$ |
| | Surface existence area ratio of rubber (non-polar:polar) | 7.5:2.5 | 7.5:2.5 | 7.5:2.5 | 7.5:2.5 | 7:3 | 7.5:2.5 |
| Surface layer | Fluororesin <1> PVDF | 99 | 75 | — | 75 | 75 | — |
| | Flororesin <2> PVDF | — | — | 60 | — | — | — |
| | Fluororesin <3> PTFE + PFA | — | — | — | — | — | — |

TABLE 2-continued

| | | | | | | | |
|---|---|---|---|---|---|---|---|
| | Fluororesin <4> PVDF | — | — | — | — | — | 75 |
| | (Meth)acrylic resin <1> PMMA | 1 | 25 | | 25 | 25 | 25 |
| | (Meth)acrylic resin <2> PMMA | — | — | 40 | — | — | — |
| | Carbon black | 45 | 20 | 45 | 60 | 40 | 40 |
| | Roughness forming particle <1> porous | 30 | 30 | 30 | 30 | 30 | 30 |
| | Roughness forming particle <2> solid | — | — | — | — | — | — |
| | Relative permittivity of surface layer | 9 | 13 | 24 | 15 | 14 | 9 |
| | Resistance value (Ω) of surface layer | $5.2 \times 10^5$ | $9.0 \times 10^5$ | $1.9 \times 10^4$ | $1.0 \times 10^4$ | $4.3 \times 10^4$ | $3.7 \times 10^6$ |
| | Resistance difference between materials logΩ | 0.2 | 0.2 | 0.1 | 0.2 | 0.2 | 0.2 |
| | Young's modulus difference between materials GPa | 0 | 0 | 0 | 0 | 0 | 0.07 |
| | Elastic recovery rate difference between materials % | 5 | 5 | 0 | 5 | 5 | 5 |
| | Relative permittivity difference between materials | 2 | 2 | 1 | 2 | 2 | 2.4 |
| Evaluation | Charging property (discharge amount) | X | ◎ | ◎ | X | X | X |
| | Charging property (charge amount) | ◎ | X | X | ◎ | X | X |
| | Anti-fouling property | ◎ | ◎ | ○ | ◎ | ◎ | ◎ |
| | Durability | ○ | ◎ | ◎ | ◎ | ◎ | ◎ |

In Comparative Example 1, the area ratio of the polar rubber at the surface of the elastic body layer is too small, and the relative permittivity of the elastic body layer is too small. Thus, the discharge amount becomes too large, and image deterioration with black and white spots occurs. In Comparative Example 3, the area ratio of the polar rubber at the surface of the elastic body layer is too large, and the relative permittivity of the elastic body layer is too large. Thus, insufficient charging causes image deterioration with fogging. In Comparative Example 2, the content of the carbon black of the elastic body layer is small, and the resistance value of the elastic body layer is too large. Thus, insufficient charging causes image deterioration with fogging. In Comparative Example 4, the content of the carbon black of the elastic body layer is large, and the resistance value of the elastic body layer is too small. Thus, the discharge amount becomes too large, and image deterioration with black and white spots occurs.

In Comparative Example 5, the content of the fluororesin in the surface layer is too large, and the relative permittivity of the surface layer is too small. Thus, the discharge amount becomes too large, and image deterioration with black and white spots occurs. In Comparative Example 7, the content of the fluororesin in the surface layer is too small, and the relative permittivity of the surface layer is too large. Thus, insufficient charging causes image deterioration with fogging. In Comparative Example 6, the content of the carbon black of the surface layer is small, and the resistance value of the surface layer is too large. Thus, insufficient charging causes image deterioration with fogging. In Comparative Example 8, the content of the carbon black of the surface layer is large, and the resistance value of the surface layer is too small. Thus, the discharge amount becomes too large, and image deterioration with black and white spots occurs.

In Comparative Example 9, the product of the oil absorption amount and the specific surface area of the carbon black of the elastic body layer is large, and the relative permittivity of the elastic body layer is too large. Thus, insufficient charging causes image deterioration with fogging. In addition, the resistance value of the elastic body layer is also too small. Thus, the discharge amount becomes too large, and image deterioration with black and white spots occurs. In Comparative Example 10, the relative permittivity of the fluororesin of the surface layer is small at 7.6, and the relative permittivity of the surface layer is too small. Thus, the discharge amount becomes too large, and image deterioration with black and white spots occurs. In addition, the volume resistivity is large at $2.1 \times 10^{14}$ Ω·cm, and the resistance value of the surface layer is large. Thus, insufficient charging causes image deterioration with fogging.

In contrast, in Examples, the elastic body layer contains a non-polar rubber, a polar rubber, and a carbon black and has a relative permittivity of 7 to 29 and a resistance value of $6.0 \times 10^4$Ω to $5.0 \times 10^6$Ω, and the surface layer contains a fluororesin and a (meth)acrylic resin and has a relative permittivity of 10 to 22 and a resistance value of $1.2 \times 10^4$Ω to $8.8 \times 10^5$Ω. Thus, the discharge amount decreases, and image deterioration with black and white spots is suppressed. In addition, with the above configuration, movement of charge occurs more easily, and the charging property is excellent even with a reduced discharge amount. Thus, image deterioration with fogging due to insufficient charging is also suppressed.

Although the embodiments and Examples of the disclosure have been described above, the disclosure is not limited to the above embodiments and Examples, and various modifications are possible within a scope that does not deviate from the spirit of the disclosure.

The invention claimed is:

1. A charging roll for electrophotographic apparatuses comprising: a shaft body, an elastic body layer formed on an outer circumferential surface of the shaft body, and a surface layer formed on an outer circumferential surface of the elastic body layer, wherein the elastic body layer contains a non-polar rubber, a polar rubber, and a carbon black, and has a relative permittivity of 7 or more and 29 or less and a resistance value of $6.0\times10^{4}\Omega$ or more and $5.0\times10^{6}\Omega$ or less, and the surface layer contains a fluororesin and a (meth) acrylic resin, and has a relative permittivity of 10 or more and 22 or less and a resistance value of $1.2\times10^{4}\Omega$ or more and $8.8\times10^{5}\Omega$ or less.

2. The charging roll for electrophotographic apparatuses according to claim 1, wherein the non-polar rubber and the polar rubber are present at a surface of the elastic body layer at an area ratio of non-polar rubber:polar rubber=9:1 to 7:3.

3. The charging roll for electrophotographic apparatuses according to claim 1, wherein the non-polar rubber is isoprene rubber or natural rubber, and the polar rubber is nitrile rubber or hydrin rubber.

4. The charging roll for electrophotographic apparatuses according to claim 1, wherein the carbon black has an average particle diameter of 36 nm or more and 80 nm or less, and has a product of a dibutyl phthalate (DBP) absorption amount and a specific surface area of 1728 or more and 5445 or less.

5. The charging roll for electrophotographic apparatuses according to claim 1, wherein the carbon black is included at a content of 15 parts by mass or more and 50 parts by mass or less with respect to a total of 100 parts by mass of the non-polar rubber and the polar rubber.

6. The charging roll for electrophotographic apparatuses according to claim 1, wherein the elastic body layer is composed of a composition that does not comprise an ionic conductive agent.

7. The charging roll for electrophotographic apparatuses according to claim 1, wherein the fluororesin and the (meth) acrylic resin are included at a content ratio, by mass ratio, of fluororesin:(meth)acrylic resin=9.5:0.5 to 7:3.

8. The charging roll for electrophotographic apparatuses according to claim 1, wherein the fluororesin has a relative permittivity of 8 or more and 10 or less and a volume resistivity of $1.0\times10^{13}$ Ω·cm or more and $1.0\times10^{14}$ Ω·cm or less.

9. The charging roll for electrophotographic apparatuses according to claim 1, wherein the fluororesin is polyvinylidene fluoride.

10. The charging roll for electrophotographic apparatuses according to claim 1, wherein the fluororesin and the (meth) acrylic resin have a difference in volume resistivity of 0.2 log Ω or less.

11. The charging roll for electrophotographic apparatuses according to claim 1, wherein the fluororesin has an indentation Young's modulus of 0.65 GPa or more and 0.75 GPa or less and an elastic recovery rate of 40% or more and 50% or less, and the (meth)acrylic resin has an indentation Young's modulus of 0.65 GPa or more and 0.75 GPa or less and an elastic recovery rate of 45% or more and 50% or less.

12. The charging roll for electrophotographic apparatuses according to claim 1, wherein the fluororesin and the (meth) acrylic resin have a difference in indentation Young's modulus of 0.1 GPa or less, and have a difference in elastic recovery rate of 5% or less.

13. The charging roll for electrophotographic apparatuses according to claim 1, wherein the fluororesin has a tensile strength of 28 MPa or more and 40 MPa or less.

14. The charging roll for electrophotographic apparatuses according to claim 1, wherein the fluororesin and the (meth) acrylic resin have a difference in relative permittivity of 2 or less.

15. The charging roll for electrophotographic apparatuses according to claim 1, wherein the surface layer further contains a roughness forming particle.

16. The charging roll for electrophotographic apparatuses according to claim 15, wherein the roughness forming particle is a porous particle.

* * * * *